L. A. SUBERS.
PNEUMATIC TIRE FABRIC HAVING ANNULAR ELASTIC ZONES.
APPLICATION FILED OCT. 17, 1910.
1,026,836.
Patented May 21, 1912.
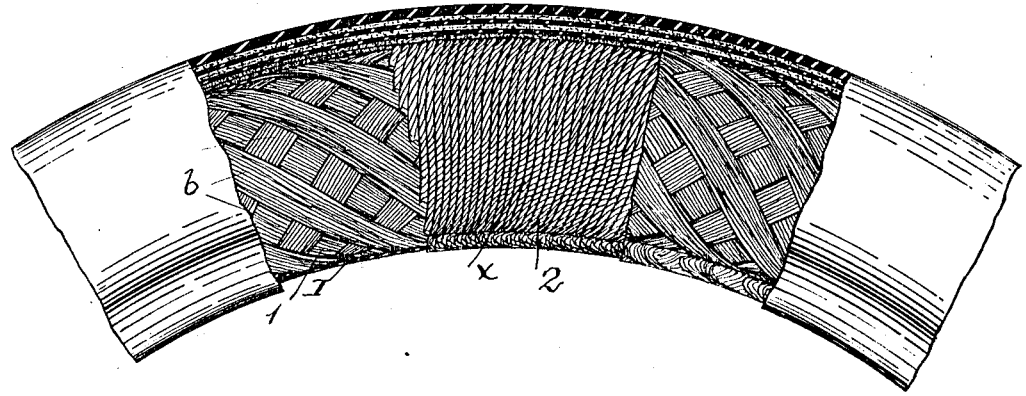
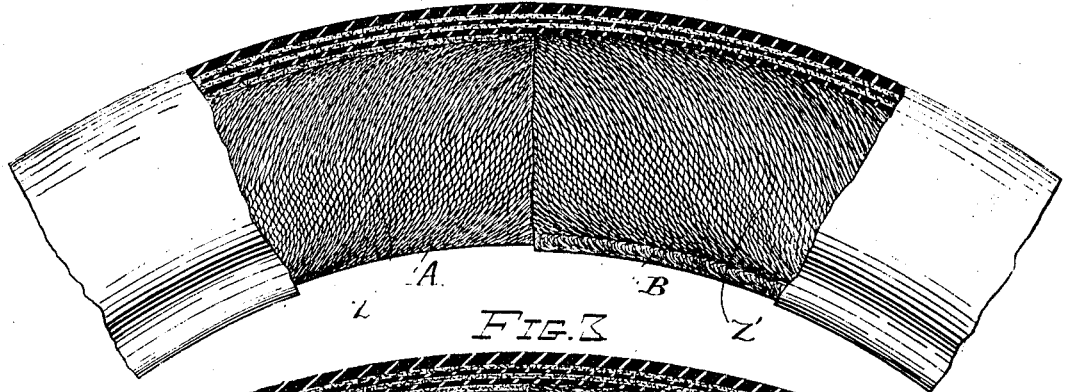
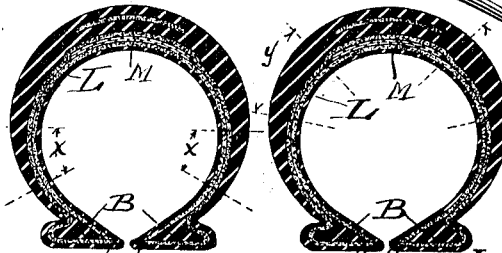

UNITED STATES PATENT OFFICE.

LAWRENCE A. SUBERS, OF CLEVELAND, OHIO.

PNEUMATIC-TIRE FABRIC HAVING ANNULAR ELASTIC ZONES.

1,026,836.　　　　　Specification of Letters Patent.　　Patented May 21, 1912.

Application filed October 17, 1910. Serial No. 587,631.

*To all whom it may concern:*

Be it known that I, LAWRENCE A. SUBERS, a citizen of the United States, and resident of Cleveland, in the county of Cuyahoga and State of Ohio, have invented certain new and useful Improvements in Pneumatic-Tire Fabrics Having Annular Elastic Zones, of which I hereby declare the following to be a full, clear, and exact description, such as will enable others skilled in the art to which it appertains to make and use the same.

The objects of the invention are to provide an automobile tire in which certain definitely predetermined annular portions or zones are capable of a greater amount of expansion than the other portion or portions, whereby certain portions of the tire are caused to become more elastic and yielding than others. The more expansible or yielding portion or portions can be positioned in any part of the tread or side walls of the tire to form annular zones which will have more resiliency than other portions and will relieve the more rigid portions from the flexing strain caused by constant movement under great pressure. In this fabric the annular zones of greater elasticity can be positioned wherever desired, near the tread surface or near the clencher rim or rim side, or at the tread, according to the action desired. If the more elastic zones are positioned at or near the tread surface that surface will become more resilient and softer in action, if they are positioned on both sides of the tire near the rim side the action of the tire will be more resilient than if the zones were not employed and the tire will bend at the resilient zones instead of at the tread, thus giving lightness of action and resiliency where the tire bends the most without affecting the rigidity of the tread surface or of the lower sides.

The prime object is to provide a means for obtaining a zone or zones of increased elasticity and expansibility in any desired portion of the tire without lessening its strength and without division or patching of the fabric, all parts thereof being unitary in construction.

Further objects are to provide an unwoven, laminated fabric formed of cohesive interwound members and sometimes with spirally wound members also, which is flexible and elastic and in which the component members are approximately incapable of frictional action upon each other.

Further objects are to utilize a portion of interwound fabric in which metallic bands are incorporated to form an armored or reinforced belt or insertion upon the tread side of the tire whereby the tire is rendered substantially puncture proof and not liable to injury or abrasion from the ordinary cutting and perforating objects encountered in actual service.

The invention is illustrated in the accompanying drawings, hereinafter more fully described and specifically pointed out in the claims.

In the accompanying drawings Figure 1 is a side elevation of a tire with the layers broken away showing the exterior rubber cover or cushion, a layer composed of interwound bands formed of untwisted cabled threads embedded in rubber regularly spaced to form a two group system of the same general character as shown in my application Ser. No. 540,982 filed January 31, 1910, a second layer composed of a spiral twisted cord or cords and a third layer composed of bands formed of untwisted cabled threads embedded in rubber arranged in a two group system similar to that shown in the first layer. The arrangement of the zones of varied expansibility is clearly shown in this view; Fig. 2 is a similar view showing two layers of twisted cords applied at right angles to each other, each containing a zone of expansion; Fig. 3 is a similar view showing two layers of fabric composed each of bands of twisted cords, interwound in a four group system, as described in my previous application referred to, and each layer is provided with an annular expansion zone; Fig. 4 is a transverse section of a tire, the position of expansion zones near the rim side being indicated by means of dotted lines, and also showing an armored strip in section; Fig. 5 is a similar view showing expansion zones near the tread side, it also shows an armored belt in transverse section; Fig. 6 is a side view of a cord having twisted zones therein.

In these views in Fig. 1 a two ply layer 1 is shown, having a heavy coating L of unvulcanized rubber, which is shown in Figs. 4 and 5. The mandrel employed is perfectly straight and cylindrical since the fabric is bound together with a tenacious vulcanizable substance such as rubber, which is thoroughly incorporated therewith, and the arrangement, of the component members of the tire fabric is such as to permit of expanding the tread side and of molding the tubular fabric after it is constructed over a suitable mold or form to the desired shape of the tire before it is vulcanized. To accomplish this result the tube is cut through longitudinally for removal from the mandrel, and the cut edges of the fabric layers c—c are separated and molded over the beads B at the rim side to form a tire, as shown in Figs. 4 and 5. The first layer 1 shown is composed of equally spaced bands b, b, of cabled thread embedded in rubber, and is constructed by the same principle of interwinding as described in my former application hereinbefore mentioned. First a series of parallel equally spaced rubbered bands are wound upon the mandrel at an angle of substantially 45° to any longitudinal surface line in that layer. Upon this series of bands is wound a similar series of equally spaced bands, at approximately right angles thereto, or at an angle of 135° to the said longitudinal surface line; upon this second series is wound a third series of bands in parallel rows, equally spaced apart and positioned intermediate of the rows of bands of the first series, and a fourth series of bands parallel to the said second series is wound upon the third series and positioned intermediate of the bands comprising the second series, so that all openings are covered and a two ply fabric is constructed which is compressed until the bands of one series fill the openings between the bands of the other series, and the edges of the bands of one series engage the edges of the parallel bands composing the other series, thus preventing the bands from sliding upon each other. This layer is capable of expansion at the tread side and while giving longitudinal strength to the tire is resilient and compressible, to a high degree. The layer is not woven, braided, interlaced, or interlocked, but the bands are bound together to form a unitary layer by means of the rubber binding incorporated therewith. This manner of constructing a layer may be designated a two group system. The manner of embedding the bands in rubber, whether by winding them in fluid rubber or by coating them with rubber previously to winding them is immaterial to this invention. They should be thoroughly coated and impregnated so as to reduce to a minimum the frictional action of one member upon another while the tire is in motion and under compression, and after vulcanization thereof. The bands of cabled yarns or threads have very little twist and hence form a less rigid fabric than if formed of cords which have a large number of twists per inch, and hence the friction of one member on another is lessened and the conditions of speed and compression endured in actual service are better prepared for and the life of the tire prolonged under rough usage.

The second layer 2 shown in Fig. 1 is composed of a transversely and spirally wound twisted cord or cords which under this method of construction when incorporated in a tire fabric would make it exceedingly rigid, expanding but little under high internal pressure but capable of being molded to the shape of the tire. To obtain the requisite amount of expansibility and of resiliency in this layer when incorporated in this specially designed tire fabric and to provide for this elasticity at exactly the desired position or positions in the tire, certain predetermined annular parts or zones in this layer are given greater elasticity, that is will expand to a higher degree than the body portion and will give to this layer resiliency where it will be of the greatest advantage in giving action and durability to the tire and prevent crushing or breaking of the fabric, which is peculiarly liable to occur at the sides or near the rim. This increased amount of expansion in a zone is obtained by means of increasing the elasticity or stretching capabilities of each of the component twisted cords at the points where they form this zone, and is caused by increasing the number of twists per inch in the cords at those points, the amount of twist being the same in all cords at corresponding points. For instance, if the amount of twist is 1-6/10 per inch in the main portion of an approximately 3/64" diameter cord or thread the number of twists per inch at the zone portion of the cord can be from three to five twists per inch or even more according to the size and material of which the thread is composed and according to the amount of resiliency desired. Since the entire layer composed of such cords will expand under internal pressure, it will expand a proportionally greater amount at the zone portions than elsewhere. One of the cords is illustrated in Fig. 6, the regularly recurring zones Z, Z shown with the intermediate more rigid portion T, the zones being of any length desired. The cords can be twisted by machinery so that the zones will occur in all cords at regular predetermined intervals and when wound upon a mandrel either as a single cord or in bands of cords the layer of cords will have incorporated within it an annular zone or annular zones of a greater degree of elasticity than the body portion. In Figs. 1 and 4 these zones are shown at x—x upon the sides near the rim side, and in Fig. 5 they are shown at y—y located on each side of the tread surface. In this manner the tire can be made more resilient on the sides and hence will be much less liable to become broken when the tire is subjected to hard service. The reduced rigidity of the annular zones in the circumferentially wound layer permits the tire to yield most easily at those portions and the fibrous members united in rubber provide the required flexibility without lessening the strength and with obvious increase in durability, and this layer is further designed to act with the other fibrous members in withstanding the various stresses to which the tire is subjected.

The annular zone system for making predetermined portions of the tire more resilient than others may be worked out in fabric layers of many kinds. In Fig. 2 the layers of twisted cord A and B are wound at right angles to each other in closely approximated parallel rows as described in my former application, one layer running at an angle of 45° and the other layer running at an angle of 135°, to any longitudinal surface line on that layer. The zones are clearly shown at Z and Z' respectively.

In Fig. 3 the two layers $a$ and $a'$ are formed of parallel equally spaced bands, arranged in eight series to form a four group system of two ply fabric. The annular zones are clearly shown at Z and Z'. This fabric is laminated, not woven, braided or interlaced in any manner, but is formed of layers composed of series of three parallel fibrous cords forming bands wound parallel to each other at a predetermined angle on a mandrel, and one series so spaced in relation to other series that the other series just fill the spaces between the members of the first series, and wound alternately with an equal number of series similarly spaced, and wound at an angle thereto, which may be shown a right angle. The first of the latter series is wound on the first of the former series and the remainder of each series wound alternately in the same order, and all series compressed to fill all openings, and cohering together in a coating of adhesive material, such as vulcanizable rubber.

Having described the invention what I claim as new and desire to secure by Letters Patent is:

1. In a pneumatic tire, a layer of fibrous members therein, inclosing the sides and tread surface, said layer composed of twisted cords, and having an integral annular zone therein, the cords in which have a greater amount of twist than in the other portions, the limit of elasticity of the fibrous members in said zone being greater than in the fibrous members composing the rest of said layer.

2. In a pneumatic tire, a layer of fibrous members therein composed of twisted cords and having integral annular zones therein, one on each side of the tread side, the cords in which zones have a greater amount of twist than in the other portions, the limit of elasticity in the fibrous members composing the said zones being greater than in the fibrous members composing the rest of said layer.

3. In a pneumatic tire, a layer composed of twisted cords elastically united together, each cord provided with regularly recurring zones in which the limit of elasticity is greater than in other portions, the corresponding zone portions in said cords forming corresponding annular zone portions in said layer.

4. In a pneumatic tire, layers composed of unwoven laminated cohering regularly spaced bands of fibrous materials, laid at an angle to the sides of the tire, a lining of vulcanizable material, and an outer layer for controlling the limit of expansibility of the tire, said layers each provided with annular integral zones, in which the ratio of elasticity is greater than in the other portions.

5. In a pneumatic tire, layers composed of unwoven laminated cohering regularly spaced bands of fibrous material, and a more rigid controlling outer layer composed of parallel twisted cords, corresponding portions of said twisted cords having a greater limit of expansibility than other portions, whereby annular zones are formed in the tire, having a higher degree of expansibility than other portions.

In testimony whereof, I hereunto set my hand this 14th day of October 1910.

LAWRENCE A. SUBERS.

In presence of—
ERNEST MOSMAN,
S. L. EXLINE.